United States Patent [19]
Fitch

[11] 3,774,447
[45] Nov. 27, 1973

[54] FLUID FLOW RATIO AND PRESSURE RATIO INDICATING DEVICE

[75] Inventor: Eugene K. Fitch, Charlottesville, Va.

[73] Assignee: Teledyne, Inc., Los Angeles, Calif.

[22] Filed: May 30, 1972

[21] Appl. No.: 258,096

[52] U.S. Cl.............................................. 73/205 R
[51] Int. Cl. ............................................. G01f 1/00
[58] Field of Search.................. 73/205 R, 207, 228

[56] References Cited
UNITED STATES PATENTS

| | | | |
|---|---|---|---|
| 2,331,153 | 10/1943 | Ackley | 73/205 R |
| 1,614,529 | 1/1927 | Lundquist | 73/207 |
| 3,085,430 | 4/1963 | Gray | 73/228 X |

Primary Examiner—Richard C. Queisser
Assistant Examiner—Arthur E. Korkosz
Attorney—Eugene K. Fitch

[57] ABSTRACT

This instrument has a generally cylindrical casing member with an inner stop wedge for stopping rotation of an inner vane in either direction. A novel feature is an arcuate gas or other fluid discharge port in the bottom surface over which the rotatably mounted vane can travel in close proximity thereto. A suitable fluid inlet port is provided in the bottom surface on either side of the stop wedge and adjacent the wedge. The bottom surface may be part of a plate or disc screwed or otherwise fastened to the cylindrical casing portion or integral therewith. Similarly the upper closure member may be a disc attached to the cylindrical casing portion and having a central hole through which a shaft attached to the vane is rotatable. This shaft carries a pointer which indicates flow ratio or pressure ratio of the fluid on the respective faces of the vane which takes up a position depending upon the ratio of fluid flow through the two inlet ports. It is preferable that the vane be of aluminum or other light weight material. The vane can be cemented to the shaft or pressed into a slot in the shaft.

6 Claims, 3 Drawing Figures

PATENTED NOV 27 1973  3,774,447

FLUID FLOW RATIO AND PRESSURE RATIO INDICATING DEVICE

An object is to provide a fluid flow instrument for gases such as air or liquids such as water, arranged to indicate fluid flow ratio.

Another object is to provide an instrument which will indicate the pressure ratio of fluid in two fluid supply pipes, tubes, or other fluid supply means.

A further object is to provide an instrument having a vane which takes up stable positions in accordance with the ratio of pressure or flow of fluid on the two faces of the vane.

An additional object is to provide a fluid flow ratio and pressure ratio indicating means of simple construction and reliable operation, and having suitable scales on a portion of the casing.

A further object is to provide an instrument havin a vane which takes up stable positions in accordance with the ratio of flow of fluid on the two faces of the vane.

An additional object is to provide a fluid flow ratio and pressure ratio indicating means of simple construction and reliable operation.

Other objects will appear in the following specification.

Figure 1:
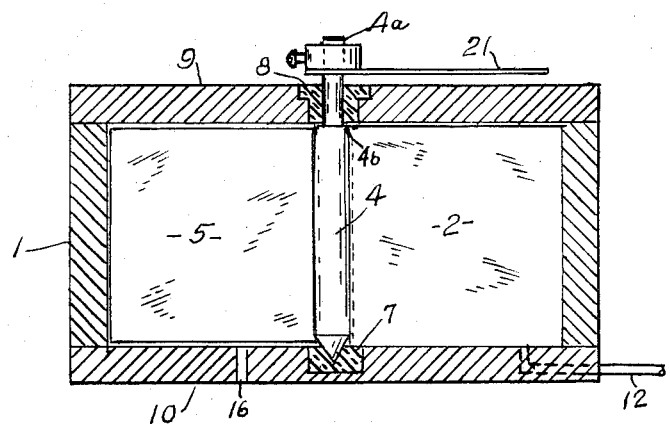
FIG. 1 is a part sectional elevation of my FLUID FLOW RATIO AND PRESSURE RATIO INDICATING MEANS.
Figure 2:
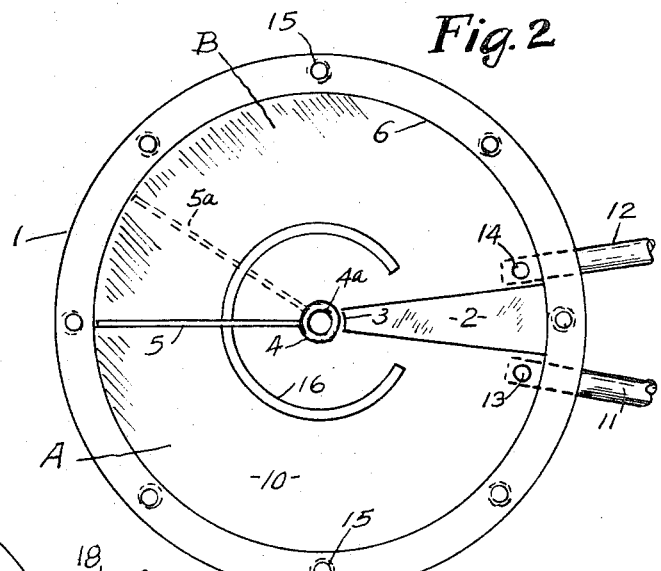
FIG. 2 is a plan view, with cover removed, of the device shown in FIG. 1.

In FIGS. 1 and 2 cylindrical casing member 1 has integral wedge-shaped wall or partition 2 which has curved inner edge 3 closely adjacent shaft 4 to which is attached vane 5 which can be rotated close to the inner cylindrical surface of casing member 1. Member 2 acts as a stop for the vane in both directions of rotation. Shaft 4 is rotatably supported in bearing 7 which may be a jewel and the shaft is guided by ring-like bearing 8 fastened in cover plate 9 which bearing may also be a jewel. Bottom plate or disc 10 and cover disc 9 are fastened to cylindrical casing member 1 by means of suitable screws. Dowel pins may be used for aligning the end discs or plates properly.

The upper edge of member 5 is closely spaced from the inner surface of cover plate 9 and the cover plate 9 may be in contact with the upper edge of wall or partition 2 when plate 9 is screwed onto casing member 1. Similarly, plate 10 may be in contact with the lower edge of wedge or wall 2 when plate 10 is screwed to the lower rim of casing member 1. The upper portion 4a of shaft 4 passes through guide bearing 8 fastened in cover member 9. Upward movement of shaft 4 is limited by shoulder 4b striking the bearing. Limited vertical displacement of shaft 4 is allowed but not enough to cause vane 5 to strike cover 9. Similarly the bottom edge of vane 5 is arranged to sweep over the inner surface of plate 10 and closely spaced therefrom.

As shown in FIG. 2 fluid supply tubes or pipes 11 and 12 are sealed in suitable openings in bottom plate or disc 10. These pipes are closed at their inner ends except for respective fluid supply ports 13 and 14 which are preferably flush with the inner surface of plate 10 or below this surface. These pipes may be of rectangular cross section in order to facilitate the placing of ports 13 and 14. Threaded holes 15 in the upper and lower rims of member 1 will receive screws for fastening the end plates. The lower plate 10 may be integral with casing member 1, if desired.

Plate 10 has arcuate slot 16 coaxial with shaft 4 and extending through an angle of approximately 270° more or less. It is not essential that the slot be coaxial but that is the preferred construction. The slot 16 extends through plate 10 to atmosphere. This slot serves as discharge openings for fluid on either side of vane 5.

Figure 3:
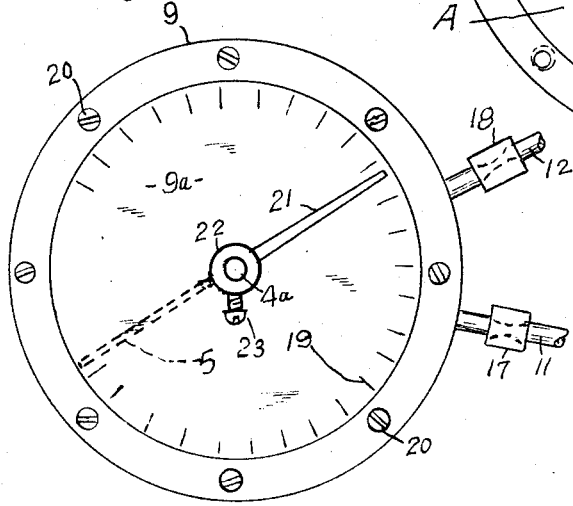
FIG. 3 is a top plan view of the instrument, showing the pointer and scale and indicating restricted fluid input tubes. The vane is indicated in a different position from that in FIG. 2.

In FIG. 3 like parts are given similar numerals as in FIGS. 1 and 2. In order to indicate pressure ratio instead of flow ratio it is only necessary to provide restrictions 17 and 18 in respective supply tubes 11 and 12. If these restrictions have equal resistance to fluid flow and if equal pressures are applied to the inlet pipes 11 and 12, the flows through the restrictions will also be equal. If equal flows are passing through the pipes and chambers on either side of the vane the latter will remain centered over the curved slot 16 as indicated by the solid lines of element 5 in FIG. 2. Scale 19 (FIG. 3) indicating fluid flow ratio is provided in or on the upper surface of disc 9 and screws 20 are threaded into holes 15 (FIG. 2) to fasten cover plate 9 in position. Pointer 21 having hub 22 is fastened to shaft portion 4a by means of set screw 23 although the hub may be threaded onto the shaft position 4a. Scale 19 may be numbered or otherwise marked in any desired way. One scale may be used to indicate fluid flow ratio and another scale may be used to indicate pressure ratio. The restrictions 17 and 18 may be unscrewed or otehrwise removed so that full flow through the inlet pipes can take place, if desired. Likewise, scale 19, for pressure ratio and a similar scale for flow ratio may be made on separate arcuate strips so that either can be quickly moved into working position.

Referring particularly to FIG. 2, the operation of the instrument is as follows: Air or other fluid under pressure is supplied to chambers A and B on either side of vane 5. The fluid flows thorugh pipe 11 and port 13 into chamber A and fluid flows through pipe 12 and port 14 into chamber B. The fluid is discharged through slot 16 to atmosphere, the discharge for each chamber being proportional to the arcuate length of slot situated in each chamber, as defined by the position of vane 5. When the flows through porsts 13 and 14 are equal the vane 15 will take up a balanced position as shown in FIG. 2. When the flow through port 13 is greater than the flow through port 14 the vane will take up a position as indicated by the dotted vane 5a. Similarly, when the flow through port 14 is greater than the flow through port 13 the vaen will take up a position as indicated by the dotted lines 5 in FIG. 3. The position of vane 5 will determine the position of pointer 21 relative to scale 19 which may be marked off in flow ratio units or in pressure ratio units in case restrictions 17 and 18 are used; or the scales may be marked in both units.

I have found, in laboratory tests, that my construction as shown in FIGS. 1 and 2 is quite suitable for the purposes described.

I have mentioned plates 9 and 10. These will usually be in disc form and plate 10 can be cast or otherwise made integral with ring-like member 1 or it may be attached to this member by screws, as desired.

The pointer 21 is attached to collar 22 which is fastened around shaft 4a by means of screw 23. Scale 19 may be marked on upper plate 9 or on a separate disc 9a which may be screwed or cemented to upper plate or disc 9. This scale may be of non-uniform spacing if slot 19 is of uniform width as shown but the slot may be varied in width to cause the scale 19 to have markings of uniform spacing if desired. For some applications it may be desirable to have the markings of the scale become progressively closer as the ends of the scale are appraoached or to become progressively more separated. In any case the character of the scale can be changed by varying the width of slot 16 in desired manner.

What I claim is:

1. In an instrument for determining the ratio of fluid flow through first fluid supply means and through second fluid supply means connected with said instrument, a casing having a portion of its interior surface of cylindrical curvature and other portions of spaced parallel inner surfaces, a shaft having at least a portion thereof within said casing, bearing means supporting said shaft for rotary movement, partition means extending from an inner surface of said casing to the close proximity of said shaft, a vane attached to said shaft and movable relative to said cylindrical casing portion and said other portions in sufficiently close proximity thereto to prevent substantial flow of fluid through the spaces between said vane and said casing portions; said vane, partition and casing portions forming in effect two chambers the relative volumes of which are dependent upon the position of said vane relative to said partition; at least one of said casing portions having a curved slot therein positioned to be swept over by said vane as it is moved through an arc, said slot acting as a discharge port for fluid passing through said chambers, said first fluid supply means being connected with one said chamber and said second fluid supply means being connected with the other said chamber; the position of said vane relative to said casing being dependent upon the ratio of fluid flow through said first and second fluid supply means; and means including means dependent upon movement of said vane for indicating said ratio.

2. The instrument as described in claim 1 said slot being co-axial with said shaft.

3. The instrument as described in claim 1, said slot being curved and in one of said other casing portions.

4. The instrument as described in claim 1, said slot being on non-uniform width.

5. The instrument as described in claim 1 and including restricting means in at least one of said fluid supply means.

6. The instrument as described in claim 1 and including restricting means in both of said fluid supply means.

* * * * *